United States Patent
Yang et al.

(10) Patent No.: US 9,980,278 B2
(45) Date of Patent: May 22, 2018

(54) WEIGHTED SCHEDULING METRIC FOR USER EQUIPMENT IN WIRELESS COMMUNICATION SYSTEM

(71) Applicant: Alcatel-Lucent USA Inc., Murray Hill, NJ (US)

(72) Inventors: Yang Yang, Morris Plain, NJ (US); Dandan Wang, Hoboken, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 160 days.

(21) Appl. No.: 15/184,330

(22) Filed: Jun. 16, 2016

(65) Prior Publication Data

US 2017/0367109 A1 Dec. 21, 2017

(51) Int. Cl.
*H04W 72/04* (2009.01)
*H04W 72/12* (2009.01)

(52) U.S. Cl.
CPC ... *H04W 72/1252* (2013.01); *H04W 72/0486* (2013.01)

(58) Field of Classification Search
CPC ......... H04W 72/1252; H04W 72/0486; H04W 72/04; H04W 72/12
See application file for complete search history.

(56) References Cited

U.S. PATENT DOCUMENTS

| | | | |
|---|---|---|---|
| 2006/0013245 A1* | 1/2006 | Abedi | H04L 47/14 370/433 |
| 2009/0069054 A1* | 3/2009 | Zangi | H04L 5/0023 455/562.1 |
| 2009/0316591 A1* | 12/2009 | Reial | H04L 1/0023 370/252 |
| 2010/0296446 A1* | 11/2010 | Zhang | H04W 72/048 370/328 |
| 2011/0149780 A1* | 6/2011 | Bollea | H04B 7/0617 370/252 |
| 2012/0057478 A1* | 3/2012 | Brannstrom | H04W 28/10 370/252 |
| 2012/0057537 A1* | 3/2012 | Schein | H04W 72/10 370/329 |
| 2014/0317241 A1* | 10/2014 | Zhao | H04L 65/608 709/219 |
| 2014/0349695 A1* | 11/2014 | Zetterberg | H04W 72/1242 455/512 |
| 2016/0295561 A1* | 10/2016 | Papasakellariou | H04W 72/042 |
| 2017/0202005 A1* | 7/2017 | Madan | H04W 72/1231 |
| 2017/0353967 A1* | 12/2017 | Bontu | H04W 72/1247 |

* cited by examiner

*Primary Examiner* — Andrew Lee
(74) *Attorney, Agent, or Firm* — Davidson Sheehan LLP (57) ABSTRACT

A base station schedules one or more user equipment of a plurality of user equipment for wireless communication in a transmission time interval (TTI) based on a plurality of weights associated with the plurality of user equipment. In response to scheduling the one or more user equipment in the TTI, the base station modifies the plurality of weights associated with the plurality of user equipment based on a plurality of elapsed times since the plurality of user equipment were last scheduled.

20 Claims, 7 Drawing Sheets

WEIGHTED SCHEDULING METRIC FOR USER EQUIPMENT IN WIRELESS COMMUNICATION SYSTEM

BACKGROUND

Field of the Disclosure

The present disclosure relates generally to wireless communication systems and, more particularly, to scheduling user equipment in a wireless communication system.

Description of the Related Art

Wireless connectivity is provided to user equipment in a wireless communication system by a network of base stations, which may also be referred to as eNodeBs or access points. The base stations include schedulers that are responsible for scheduling access to resources of the air interface between the base station and user equipment that are served by the base station. For example, the scheduler in a base station may schedule uplink or downlink transmissions between the base station and user equipment by allocating transmission time intervals (TTIs) to the user equipment for transmission over the uplink or downlink. Multiple user equipment may be competing for access to the resources of the air interface during each TTI. For example, buffers in the base station may hold data that is ready for transmission over the downlink to a group of user equipment and buffers in the user equipment may hold data that is ready for transmission over the uplink to the base station. Schedulers typically allocate the TTIs to different user equipment to achieve "proportional fairness." For example, proportionally fair scheduling schedules user equipment on the basis of a scheduling priority that is inversely proportional to the anticipated resource consumption for transmitting the uplink or downlink data.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Proportionally fair scheduling does not necessarily provide optimal experiences to users that are using different types of applications. Field trials indicate that most of the data users in a typical wireless communication system are "thin" users that generate small amounts of traffic in frequent but irregular bursts. Examples of thin users are users of applications such as social media applications, text messaging, and the like. A smaller portion of "heavy" users upload or download large volumes of data, which may be more delay sensitive than the data generated by "thin" users. Examples of heavy users are users of streaming applications such as Netflix or Hulu. Proportionally fair scheduling typically prioritizes thin data traffic over heavy data traffic because the proportionally fair priority metric of each user is inversely proportional to the user's achieved short-term throughput, which is usually relatively small for thin data traffic. Heavy data traffic may therefore be frequently interrupted by bursty, thin data traffic. The frequent interruptions may degrade the user experience for heavy users without providing any noticeable benefit to the thin users. For example, a user of a social media website is unlikely to notice whether a status update was posted within 1 millisecond (ms) or 100 ms.

Interruptions to data traffic for heavy users in a wireless communication system may be reduced without degrading the user experience of thin users by defining a scheduling metric for user equipment that comprises a weight function and, in some embodiments, a proportional fairness (PF) metric. The weight function is determined based on an elapsed time interval since the user equipment was previously scheduled for transmission over the air interface. This weight function provides a tradeoff between the initial scheduling delay of a new burst and the throughput experienced by the bursts that are currently being served. As used herein, the term "burst" refers to data that is available for transmission to user equipment over a downlink or transmission from the user equipment over an uplink. A burst may therefore be stored in a buffer in the user equipment or a buffer in a base station that serves the user equipment. A subset of the plurality of user equipment may be scheduled based on the scheduling metrics. For example, the user equipment with the highest value of the scheduling metric may be scheduled for uplink or downlink transmission during the current TTI. In some embodiments, the weight function is also determined based on whether a buffer associated with the corresponding user equipment has data for transmission.

The values of the scheduling metrics are updated after each TTI to reflect changes in the elapsed time intervals or buffer occupancies due to transmissions during the TTI. For example, the weight function for a user equipment can be initialized to a value of 1 when data arrives in a buffer associated with the user equipment. The weight function is incremented by a predetermined value (such as 1) each time the user equipment is not scheduled for transmission in the current TTI until the weight function reaches a maximum value. The weight function is set to a "sticky" value for users that have been scheduled and are being served in the current TTI. The sticky value is a predetermined value of the weight function that defines how much boost is provided to user equipment that are being served in the current TTI, relative to other user equipment that are not being served, e.g., by delaying scheduling of the other user equipment by a time interval that is determined by the sticky value. There are different ways to define the weight function. For example, the weight for a user equipment can be set to the sticky value in response to scheduling the user equipment. For another example, the weight for the user equipment can be gradually increased from an initial low value until the weight reaches the sticky value. The weight may remain at the sticky value as long as this user is scheduled in the current TTI. The initial weight of subsequent bursts associated with other user equipment may be set to a low value (such as 0) and the weight of the new burst may be incremented until the scheduling metric is larger than the scheduling metric of at least one currently served user equipment. The newly arrived burst may then be scheduled.

Figure 1:
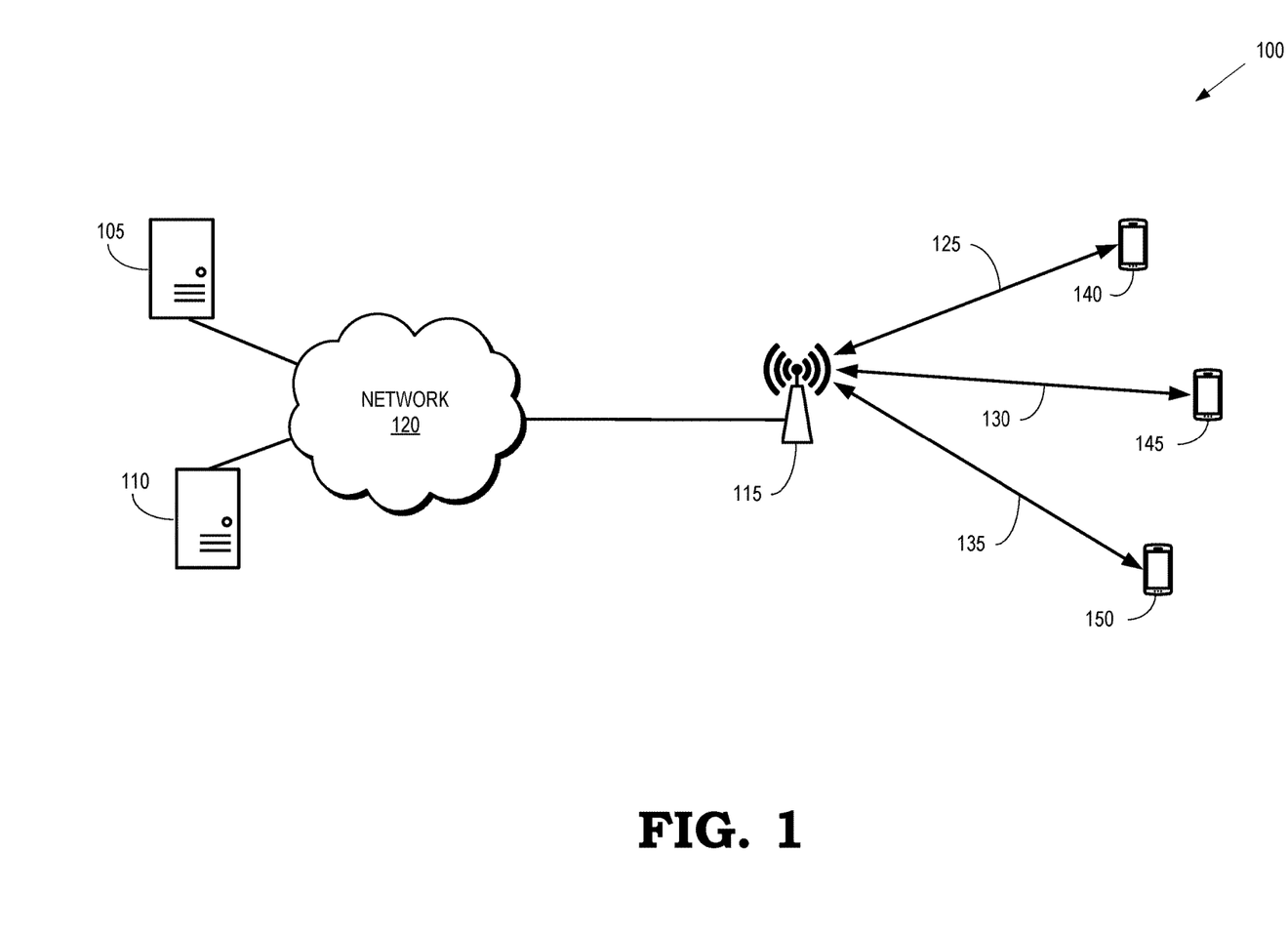
FIG. 1 is a block diagram of a wireless communication system according to some embodiments.

FIG. 1 is a block diagram of a wireless communication system 100 according to some embodiments. The wireless communication system 100 includes one or more application servers 105, 110 that support different applications. For example, the application server 105 may support applications such as Facebook, Twitter, Snapchat, text messaging, and the like. For another example, the application server 110 may support applications such as Netflix or Hulu. Uplink or downlink traffic associated with the applications supported by the application servers 105, 110 may be conveyed to one or more base stations 115 via a network 120. The base station 115 can transmit or receive the uplink or downlink traffic over air interfaces 125, 130, 135 that are established with corresponding user equipment 140, 145, 150. Some embodiments of the air interfaces 125, 130, 135 are established according to Long Term Evolution (LTE) standards established by the Third Generation Partnership Project (3GPP).

The base station 115 may implement a proportional fairness (PF) scheduler (not shown in FIG. 1) that schedules the user equipment 140, 145, 150. For example, the base station 115 may schedule the user equipment 140, 145, 150 based on a PF metric (M(u)) that is defined by the following expression:

$$M(u) = \frac{\rho(u)}{\Omega(u)},$$

where ρ is the instantaneous or supportable data rate reported by the user equipment, u, and Ω is an achieved short-term throughput for the user equipment, u, measured over a predetermined time interval. However, as discussed herein, the PF scheduler in the base station 115 may not provide an optimal experience for the user equipment 140, 145, 150 if the wireless communication system 100 includes application servers 105, 110 that support both thin users (e.g., the application server 105 that supports social networking and messaging applications) and heavy users (e.g., the application server 110 that supports streaming applications). For example, the base station 115 may prioritize thin data traffic associated with the application server 105 over heavy data traffic associated with the application server 110 because the proportionally fair priority metric of each user equipment 140, 145, 150 is inversely proportional to the user's achieved short-term throughput, which is usually small for thin data traffic. Heavy data traffic may therefore be frequently interrupted by bursty, thin data traffic, which may degrade the user experience for heavy users without providing any noticeable benefit to the thin users.

Some embodiments of the base station 115 may therefore schedule the user equipment 140, 145, 150 on the basis of a weight function that is determined based on elapsed times since the user equipment 140, 145, 150 were most recently scheduled for transmission. The weight function may also be determined based on whether data remains available for transmission between the base station 115 and the user equipment 140, 145, 150. For example, the weight function may be determined based on the presence or absence of data in buffers used to hold packets prior to transmission of the packets over the air interfaces 125, 130, 135. Some embodiments of the weight function may be determined based on a delay control metric, which may also be referred to as a weight function w(u). The delay control metric is a uniformly increasing function of a scheduling delay for a user, u. The delay control metric may include ceiling control that sets a maximum value of the metrics that can be assigned to a user. The weight function may be modified following scheduling of user equipment in each transmission time interval (TTI).

A first example of a weight function, w(u, n), is given by:

$$w(u, n) = \begin{cases} \min(1 + w(u, n-1), w_{max}) \\ w_{sticky} \\ 1 \end{cases}$$

user not scheduled in this TTI
user scheduled in this TTI but still has data in buffer
user scheduled in this TTI and no data remaining in buffer
where u indicates the user equipment 140, 145, 150 and n is an index of the TTI. The sticky value of the weight function, $w_{sticky}$, represents a time interval that corresponds to a delay between arrival of data in a buffer and scheduling of the data for transmission if other user equipment are currently being served by the base station 115. The sticky value may be set to a relatively large value such as 10 or 12 that indicates a delay of 10 or 12 TTIs. A second example of a weight function is given by:

$$w(u, n) = \begin{cases} w(u, n-1) + 1 \\ \min(StickyW(u), w(u, n-1)) + 1 \\ 0 \\ 1 \end{cases}$$

u has data, not scheduled
u scheduled, more data in buffer
u scheduled, no more data in buffer
new burst arrival at u
A third example of a weight function is given by:

$$w(u, n) = \begin{cases} w(u, n-1) + 1 \\ \min(StickyW(u), w(u, n-1)) + 1 \\ 0 \\ 1 \end{cases}$$

u has data, not scheduled
u scheduled, more data in buffer
u scheduled, no more data in buffer
new burst arrival at u
Some embodiments of the base station 105 may perform scheduling based on a scheduling metric that is a function of the weight function, an instantaneous or supportable data rate (φ reported by the user equipment, u, and an achieved short-term throughput (Ω) for the user equipment, u. For example, the scheduling metric may be defined as:

$$M(u) = \left\{ \frac{\rho(u)}{\Omega(u)} \right\}^c \cdot w(u)$$

where the parameter, c, is a scaling factor that modulates the influence of the proportional fairness metric in the scheduling decision. For example, a value of c=0 removes proportional fairness from the scheduling decision and results in a scheduling decision based entirely on the weight function.

Figure 2:
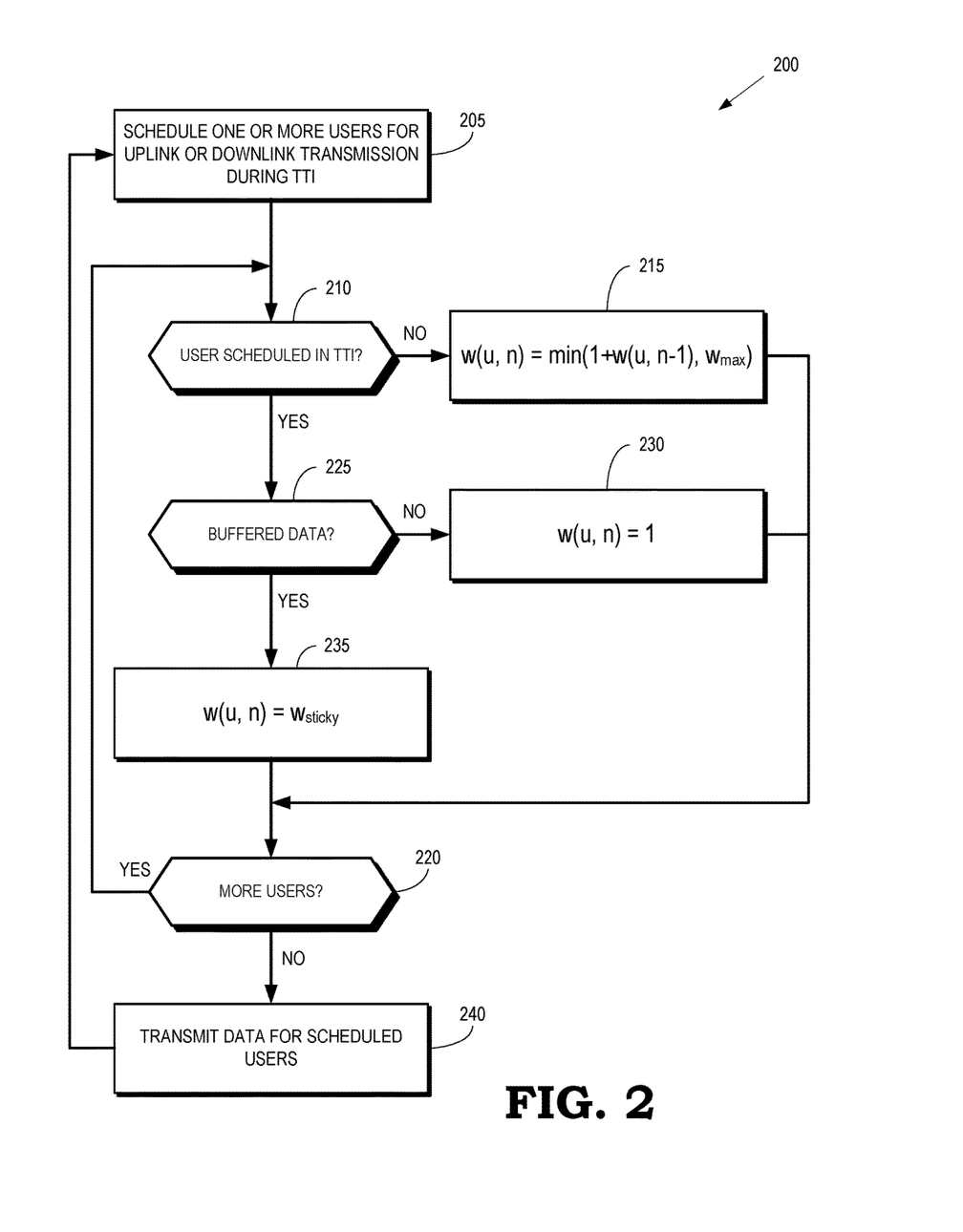
FIG. 2 is a flow diagram of a method of scheduling users based on a weight function and updating the weight function according to some embodiments.

FIG. 2 is a flow diagram of a method 200 of scheduling users based on a weight function and updating the weight function according to some embodiments. The method 200 may be implemented in some embodiments of the base station 115 shown in FIG. 1. In the interest of clarity, the embodiment of the method 200 assumes a value of the scaling factor of c=0 so that scheduling of users is based on the weight function. However, the following discussion also applies to embodiments in which the scaling factor of c is equal to a nonzero value.

At block 205, the base station schedules one or more users for uplink transmissions or downlink transmissions during a current transmission time interval (TTI). The users are indicated by different values of the index u and the current TTI is indicated by the index n−1. The base station then begins iterating through all of the users that may be eligible for scheduling in the next TTI, which is indicated by the index n.

At decision block 210, the base station determines whether the next eligible user is scheduled for transmission in the current TTI. If not, the value of the weight function associated with the user is incremented by a predetermined value at block 215. For example, the value of the weight function for the user in the subsequent TTI may be determined by incrementing the value of the weight function in the current TTI by a predetermined value of 1, although other incremental values may be used in some embodiments. The base station may stop incrementing the value of the weight function for the user when the value of the weight function reaches a maximum value of $w_{max}$. For example, the base station may increment values of the weight function on the basis of the equation:

$w(u,n)=\min(w(u,n-1)+1,w_{max})$

The method 200 then flows to decision block 220. If the user is scheduled for transmission in the current TTI, the method flows to decision block 225.

At decision block 225, the base station determines whether data remains (or will remain) available for transmission in a buffer associated with the user after the scheduled transmission of data in the current TTI. For example, the base station may determine whether data remains (or will remain) in a buffer in user equipment used by the user for uplink transmissions. For another example, the base station may determine whether data remains (or will remain) in a buffer in the base station that holds data for downlink transmissions to the user. If not, the base station sets the value of the weight function for the user to a reset value, such as a reset value of 1, at block 230. The method 200 then flows to decision block 220. If data remains available for transmission in a buffer associated with the user, the base station modifies the value of the weight function to a "sticky" value. For example, the base station may modify the value of the weight function to a sticky value of 10. The method 200 then flows to decision block 220.

At decision block 220, the base station determines whether there are more users that are associated with weight functions that are to be modified in response to scheduling of users in the current TTI. If so, the method 200 flows to decision block 210 and begins another iteration for another user. If there are no more users that may be eligible for scheduling in the next TTI, data for the scheduled users is transmitted over the air interface at block 240. For example, downlink packets may be transmitted from the base station to the user equipment. For another example, uplink packets may be transmitted from the user equipment to the base station. The method 200 may then flow to block 205 for scheduling of users for the next TTI. Although the block 240 follows the block 220 in FIG. 2, some embodiments may perform modification of the weight functions and transmission of data in a different order from the one shown in FIG. 2. For example, transmission of the scheduled data for the current TTI may be performed concurrently with, or prior to, modification of the weight functions that are used for scheduling of users in the next TTI.

Figure 3:
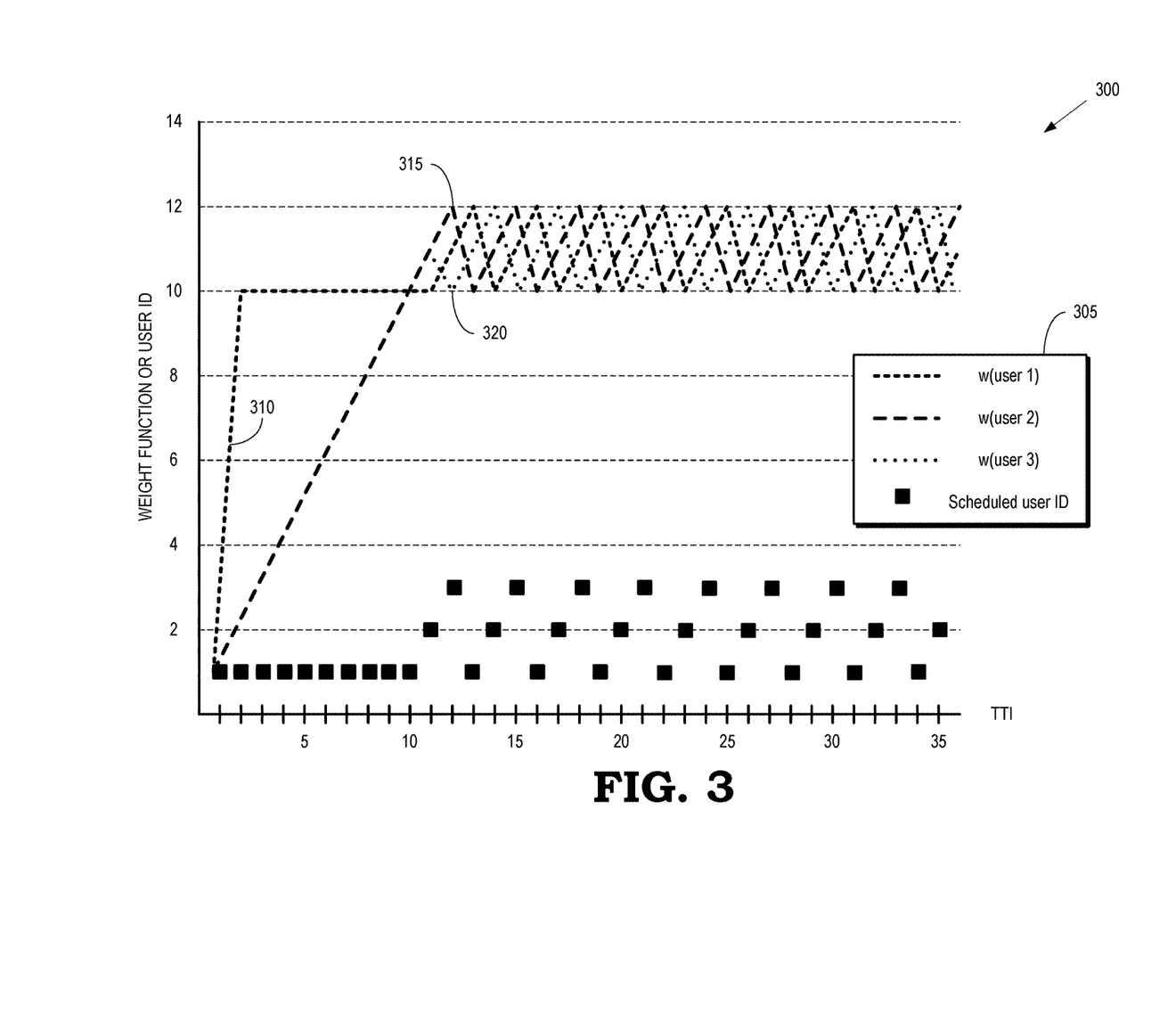
FIG. 3 is a diagram of a scheduling sequence performed by a base station that schedules users for wireless communication based on a weight function according to some embodiments.

FIG. 3 is a diagram of a scheduling sequence 300 performed by a base station that schedules users for wireless communication based on a weight function according to some embodiments. The scheduling sequence 300 may represent a scheduling sequence that occurs in some embodiments of the wireless communication system 100 shown in FIG. 1. The scheduling sequence 300 may also represent the scheduling sequence produced by a base station that implement some embodiments of the method 200 shown in FIG. 2. The horizontal axis indicates the value of the TTI and the vertical axis indicates a value of the weight function or a value of an identifier of the user that is scheduled for wireless communication during the TTI. A legend 305 indicates the line types used for the weight functions of users 1-3 and the symbol (filled square) that is used to indicate the scheduled user ID. In the illustrated embodiment, buffers associated with each of the users 1-3 include data that is available for transmission for the entire range of TTIs shown in FIG. 3.

The weight functions for each of the users 1-3 are allocated to an initial value of 1. User 1 is scheduled for transmission in TTI=1 and, consequently, the weight function 310 for user 1 is modified to a sticky value of 10. Users 2 and 3 are not scheduled for transmission in TTI=1 and, consequently, the weight functions 315, 320 of users 2 and 3 are incremented by a predetermined value of 1. At TTI=2, the weight function 310 of user 1 is larger than the weight functions 315, 320 of users 2 and 3 and so the base station schedules user 1 for transmission in TTI=2. The weight function 310 of user 1 remains at the sticky value and the weight functions 315, 320 of users 2 and 3 are incremented by the predetermined value of 1. This process continues until TTI=11. User 1 is therefore served continuously by the base station for a time interval that is determined based on the sticky value of the weight function. The sticky value therefore determines a delay between initial scheduling of the user 1 and subsequent scheduling of users 2 or 3.

At TTI=11, the weight function 315, 320 of users 2 and 3 exceed the sticky value and exceed the value of the weight function 310 of user 1. The base station therefore schedules user 3 for transmission in TTI=11. In response to scheduling user 3 for transmission, the base station modifies the weight functions 310, 315 of users 1 and 2 by incrementing the weight functions 310, 315 by the predetermined value of 1. The weight function 324 user 3 is set to the sticky value. At TTI=12, the weight function 315 of user 2 is larger than the weight functions 310, 320 of users 1 and 3. The base station therefore schedules user 2 for transmission in TTI=12. In response to scheduling user 2 for transmission, the base station modifies the weight functions 310, 320 of users 1 and 3 by incrementing the values of the weight functions 310, 320 by the predetermined value of 1. The weight function 315 for the user 2 is set to the sticky value. This process continues for the subsequent TTIs and each of the users 1-3 is scheduled for transmission in one third of the TTIs so that the resources of the air interface are fairly allocated to the users 1-3 as long as all of the users 1-3 have data available in their associated buffers for transmission.

Figure 4:
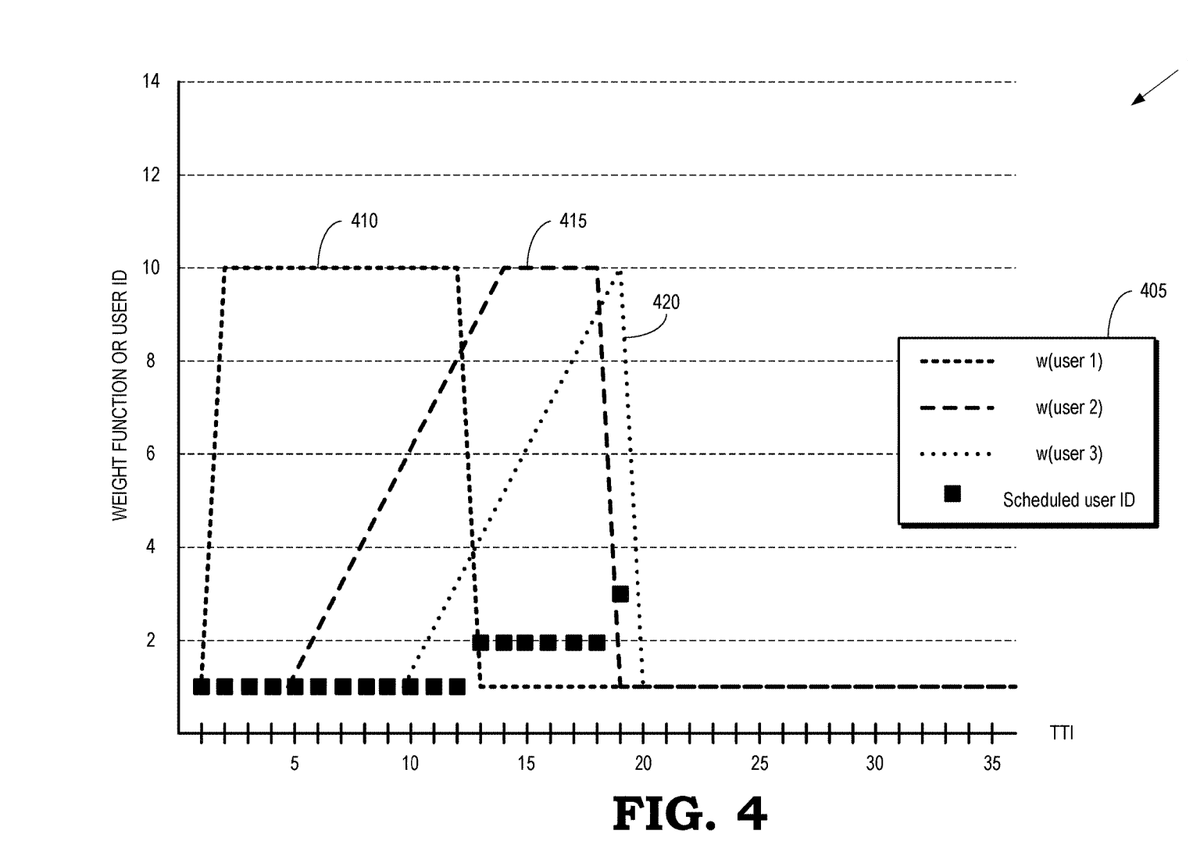
FIG. 4 is a diagram of a scheduling sequence performed by a base station that schedules newly arriving users for wireless communication based on a weight function according to some embodiments.

FIG. 4 is a diagram of a scheduling sequence 400 performed by a base station that schedules newly arriving users for wireless communication based on a weight function according to some embodiments. The scheduling sequence 400 may represent a scheduling sequence that occurs in some embodiments of the wireless communication system 100 shown in FIG. 1. The scheduling sequence 400 may also represent the scheduling sequence produced by a base station that implement some embodiments of the method 200 shown in FIG. 2. The horizontal axis indicates the value of the TTI and the vertical axis indicates a value of the weight function or a value of an identifier of the user that is scheduled for wireless communication during the TTI. A legend 405 indicates the line types used for the weight functions of users 1-3 and the symbol (filled square) that is used to indicate the scheduled user ID.

At TTI=1, user 1 is the only user that is eligible for scheduling, e.g., because user 1 has data available for transmission in an associated buffer. The weight function 410 for user 1 is set to an initial value of 1 and the base station schedules user 1 on the basis of the value of the weight function 410. In response to scheduling user 1 for transmission in TTI=1, the base station modifies the value of the weight function 410 to a sticky value of 10. User 1 is also scheduled for transmission in TTI=2 to TTI=4 and the value of the weight function 410 remains at the sticky value.

At TTI=5, user 2 becomes eligible for scheduling, e.g., because data has become available for transmission in a buffer associated with user 2. The base station assigns an initial value of 1 to the weight function 415. The value of the weight function 410 is larger than the value of the weight function 415 and the base station therefore schedules user 1 for transmission. In response to scheduling user 1 for transmission, the base station modifies the value of the weight function 415 by incrementing the weight function 415 by a predetermined value of 1. This process iterates until TTI=10.

At TTI=10, user 3 becomes eligible for scheduling, e.g., because data has become available for transmission in a buffer associated with user 3. The base station assigns an initial value of 1 to the weight function 420. The value of the weight function 410 is larger than the values of the weight functions 415, 420. The base station therefore schedules user 1 for transmission in TTI=10. In response to scheduling user 1 for transmission, the base station modifies the values of the weight functions 415, 420 by incrementing the weight functions 415, 420 by the predetermined value of 1. This process iterates until TTI=12.

At TTI=12, the last of the data in the buffer associated with user 1 is transmitted so that there is (or will be) no data left in the buffer following the transmission in TTI=12. The base station therefore modifies the value of the weight function 410 to a reset value of 1. Thus, user 1 is able to transmit all of the data in its associated buffer in a continuous burst over multiple TTI even though data was available for transmission from the buffers associated with user 2 and user 3.

At TTI=13, the base station schedules user 2 for transmission because the value of the weight function 415 is larger than the value of the weight function 420. In response to scheduling user 2 for transmission, the base station modifies the value of the weight function 415 to be equal to the sticky value and modifies the value of the weight function 420 by incrementing the values of the weight function 420 by the predetermined value of 1. This process iterates until TTI=18.

At TTI=18, the last of the data in the buffer associated with user 2 is transmitted so that there is (or will be) no data left in the buffer following the transmission in TTI=18. The base station therefore modifies the value of the weight function 415 to the reset value of 1. Thus, user 2 is able to transmit all of the data in its associated buffer in a continuous burst over multiple TTI even though data was available for transmission from the buffer associated with user 3.

At TTI=19, the base station schedules user 3 for transmission. All the data in the buffer associated with user 3 is transmitted in TTI=19. Thus, there is (or will be) no data left in the buffer following the transmission in TTI=19. The base station therefore modifies the value of the weight function 420 to the reset value of 1 for TTI=20. Thus, as a result of scheduling based on a weight function that delays scheduling based on the sticky value, the relatively short burst of data associated with user 3 did not interrupt or interfere with the longer data bursts associated with user 1 or user 2.

Figure 5:
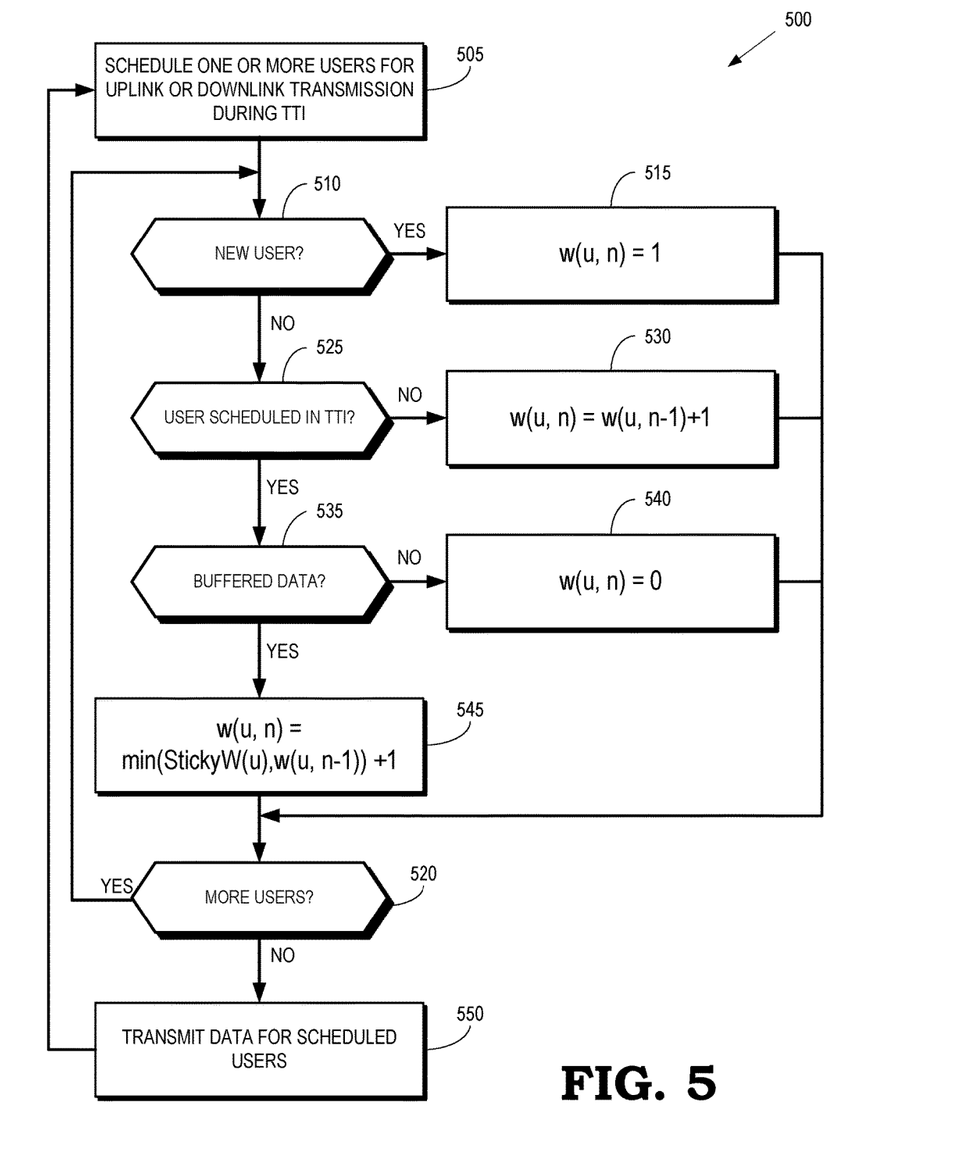
FIG. 5 is a flow diagram of a method of scheduling users that may have different sticky values associated with their corresponding weight functions according to some embodiments.

FIG. 5 is a flow diagram of a method 500 of scheduling users that may have different sticky values associated with their corresponding weight functions according to some embodiments. The method 500 may be implemented in some embodiments of the base station 115 shown in FIG. 1. In the interest of clarity, the embodiment of the method 500 assumes a value of the scaling factor of c=0 so that scheduling of users is based on the weight function. However, the following discussion also applies to embodiments in which the scaling factor of c is equal to a nonzero value.

At block 505, the base station schedules one or more users for uplink transmissions or downlink transmissions during a current transmission time interval (TTI). The users are indicated by different values of the index u and the current TTI is indicated by the index n−1. The base station then begins iterating through all of the users that may be eligible for scheduling in the next TTI, which is indicated by the index n.

At decision block 510, the base station determines whether the next eligible user is a new user, e.g., a user that was not previously eligible for scheduling but became eligible for scheduling in the next TTI. If so, the base station sets the weight function for the new user to an initial value, such as an initial value of 1, at block 515. The method 500 then flows to decision block 520. If the user is not a new user, the method flows to decision block 525.

At decision block 525, the base station determines whether the next eligible user is scheduled for transmission in the current TTI. If not, the value of the weight function associated with the user is incremented by a predetermined value at block 530. In some embodiments, the value of the weight function for the user in the subsequent TTI may be determined by incrementing the value of the weight function in the current TTI by 1. For example, the base station may increment values of the weight function on the basis of the equation:

$$w(u,n)=w(u,n-1)+1$$

The method 500 then flows to decision block 520. If the user is scheduled for transmission in the current TTI, the method flows to decision block 535.

At decision block 535, the base station determines whether data remains (or will remain) available for transmission in a buffer associated with the user after the scheduled transmission of data in the current TTI. For example, the base station may determine whether data remains (or will remain) in a buffer in user equipment used by the user for uplink transmissions. For another example, the base station may determine whether data remains (or will remain) in a buffer in the base station that holds data for downlink transmissions to the user. If not, the base station sets the value of the weight function for the user to a reset value, such as a reset value of 0, at block 540. The method 500 then flows to decision block 520. If data remains available for transmission in a buffer associated with the user, the base station modifies the value of the weight function based on a sticky value (StickyW(u)) associated with the user. Different users may have different sticky values. In the illustrated embodiment, the weight function for the user is incremented according to:

$$w(u,n)=\min(\text{Sticky}W(u),w(u,n-1))+1$$

The method 500 then flows to decision block 520.

At decision block 520, the base station determines whether there are more users that are associated with weight functions that are to be modified in response to scheduling of users in the current TTI. If so, the method 500 flows to decision block 510 and begins another iteration for another user. If there are no more users that may be eligible for scheduling in the next TTI, data for the scheduled users is transmitted over the air interface at block 550. For example, downlink packets may be transmitted from the base station to the user equipment. For another example, uplink packets may be transmitted from the user equipment to the base station. The method 500 may then flow to block 505 for scheduling of users for the next TTI. Although the block 550 follows the block 520 in FIG. 5, some embodiments may perform modification of the weight functions and transmission of data in a different order from the one shown in FIG. 5. For example, transmission of the scheduled data for the current TTI may be performed concurrently with, or prior to, modification of the weight functions that are used for scheduling of users in the next TTI.

Figure 6:
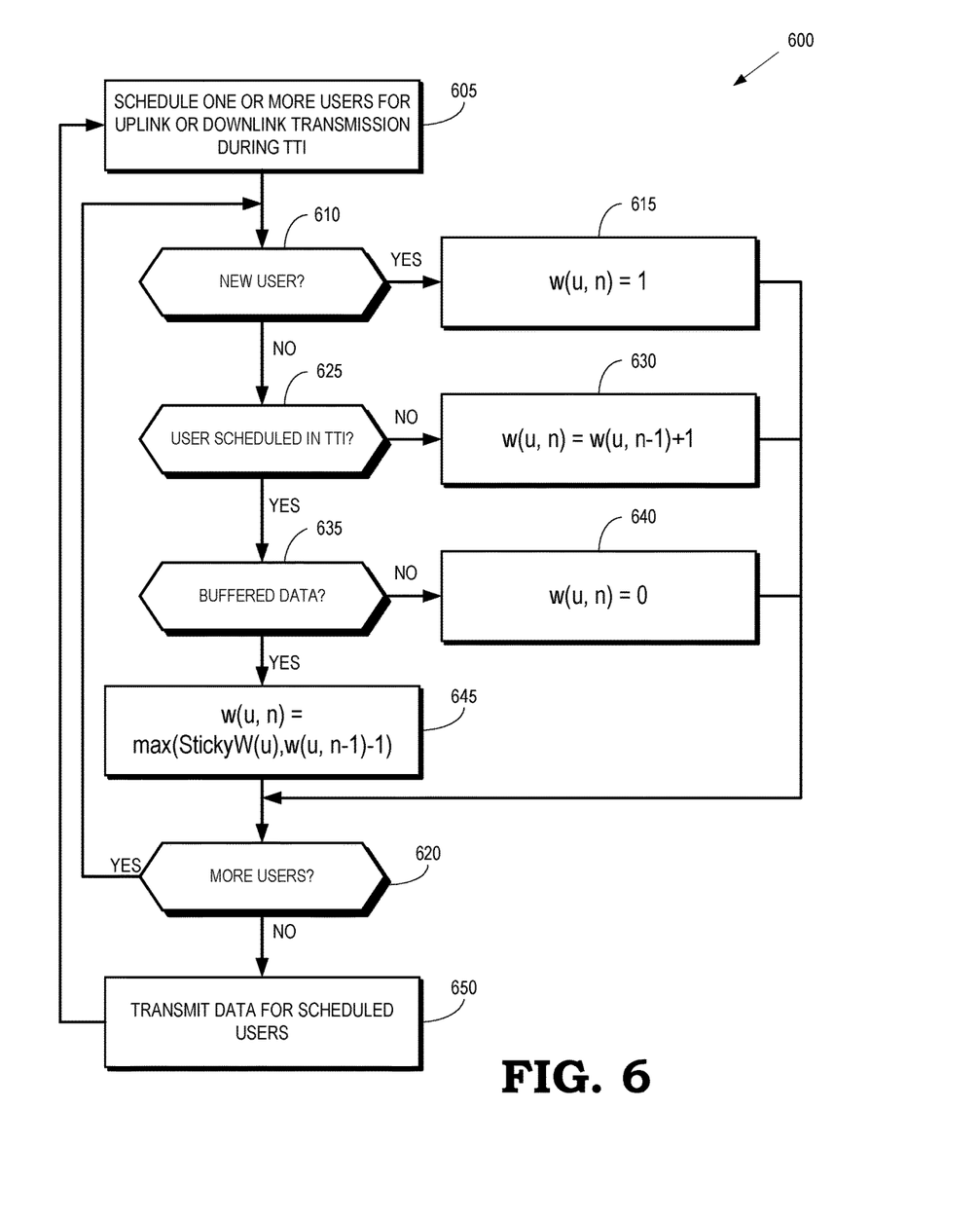
FIG. 6 is a flow diagram of a method of scheduling users including decrementing values of the weight function that are above a sticky value according to some embodiments.

FIG. 6 is a flow diagram of a method 600 of scheduling users including decrementing values of the weight function that are above a sticky value according to some embodiments. The method 600 may be implemented in some embodiments of the base station 115 shown in FIG. 1. In the interest of clarity, the embodiment of the method 600 assumes a value of the scaling factor of c=0 so that scheduling of users is based on the weight function. However, the following discussion also applies to embodiments in which the scaling factor of c is equal to a nonzero value.

At block 605, the base station schedules one or more users for uplink transmissions or downlink transmissions during a current transmission time interval (TTI). The users are indicated by different values of the index u and the current TTI is indicated by the index n-1. The base station then begins iterating through all of the users that may be eligible for scheduling in the next TTI, which is indicated by the index n.

At decision block 610, the base station determines whether the next eligible user is a new user, e.g., a user that was not previously eligible for scheduling but became eligible for scheduling in the next TTI. If so, the base station sets the weight function for the new user to an initial value, such as an initial value of 1, at block 615. The method 600 then flows to decision block 620. If the user is not a new user, the method flows to decision block 625.

At decision block 625, the base station determines whether the next eligible user is scheduled for transmission in the current TTI. If not, the value of the weight function associated with the user is incremented by a predetermined value at block 630. In some embodiments, the value of the weight function for the user in the subsequent TTI may be determined by incrementing the value of the weight function in the current TTI by 1. For example, the base station may increment values of the weight function on the basis of the equation:

$$w(u,n)=w(u,n-1)+1$$

The method 600 then flows to decision block 620. If the user is scheduled for transmission in the current TTI, the method flows to decision block 635.

At decision block 635, the base station determines whether data remains (or will remain) available for transmission in a buffer associated with the user after the scheduled transmission of data in the current TTI. For example, the base station may determine whether data remains (or will remain) in a buffer in user equipment used by the user for uplink transmissions. For another example, the base station may determine whether data remains (or will remain) in a buffer in the base station that holds data for downlink transmissions to the user. If not, the base station sets the value of the weight function for the user to a reset value, such as a reset value of 0, at block 640. The method 600 then flows to decision block 620. If data remains available for transmission in a buffer associated with the user, the base station modifies the value of the weight function based on a sticky value (StickyW(u)) associated with the user. Different users may have different sticky values. In the illustrated embodiment, the weight function for the user is decremented according to:

$$w(u,n)=\max(\text{Sticky}W(u),w(u,n-1)-1)$$

The method 600 then flows to decision block 620.

At decision block 620, the base station determines whether there are more users that are associated with weight functions that are to be modified in response to scheduling of users in the current TTI. If so, the method 600 flows to decision block 610 and begins another iteration for another user. If there are no more users that may be eligible for scheduling in the next TTI, data for the scheduled users is transmitted over the air interface at block 650. For example, downlink packets may be transmitted from the base station to the user equipment. For another example, uplink packets may be transmitted from the user equipment to the base station. The method 600 may then flow to block 605 for scheduling of users for the next TTI. Although the block 650 follows the block 620 in FIG. 6, some embodiments may perform modification of the weight functions and transmission of data in a different order from the one shown in FIG. 6. For example, transmission of the scheduled data for the current TTI may be performed concurrently with, or prior to, modification of the weight functions that are used for scheduling of users in the next TTI.

Figure 7:
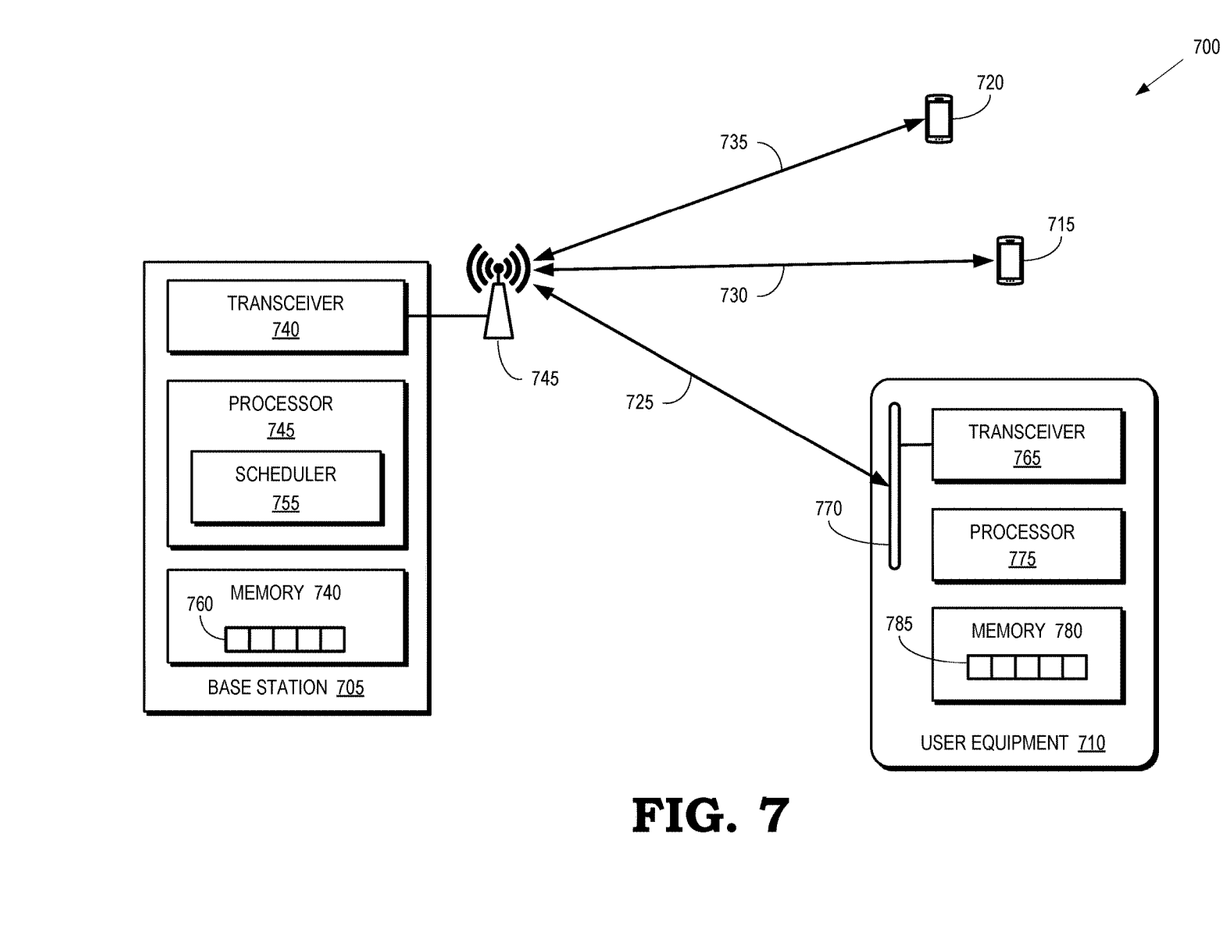
FIG. 7 is a block diagram of a wireless communication system according to some embodiments.

FIG. 7 is a block diagram of a wireless communication system 700 according to some embodiments. The wireless communication system 700 includes a base station 705 that provides wireless connectivity to user equipment 710, 715, 720 over corresponding interfaces 725, 730, 735. The wireless communication system 700 may therefore correspond to some embodiments of the wireless communication system 100 shown in FIG. 1.

The base station 705 includes a transceiver 740 that is coupled to one or more antennas 745 for providing wireless connectivity over the air interfaces 725, 730, 735. The base station the 705 also includes a processor 745 and a memory 750. The processor 745 may be configured to execute instructions such as instructions stored in the memory 750 and the memory 750 may be configured to store instructions, data that is to be operated upon by the instructions, or the results of instructions performed by the processor 745. Some embodiments of the processor 745 implement a scheduler 755 for scheduling the user equipment 710, 715, 720 for transmission in one or more TTI. Some embodiments of the memory 750 implement a buffer 760 to store data such as packets of information for transmission to the user equipment 710, 715, 720. The base station 705 may therefore be configured to implement portions of some embodiments of the method 200 shown in FIG. 2, the method 500 shown in FIG. 5, or the method 600 shown in FIG. 6.

The user equipment 710 includes a transceiver 765 that is coupled to one or more antennas 770 for providing wireless connectivity over the air interfaces 725, 730, 735. The user equipment 710 also includes a processor 775 and a memory 780. The processor 775 may be configured to execute instructions such as instructions stored in the memory 780 and the memory 780 may be configured to store instructions, data that is to be operated upon by the instructions, or the results of instructions performed by the processor 775. Some embodiments of the memory 780 implement a buffer 785 to store data such as packets of information for transmission to the base station 705. The user equipment 715, 720 may include similar entities as the user equipment 710. The user equipment 710, 715, 720 may therefore be configured to implement portions of some embodiments of the method 200 shown in FIG. 2, the method 500 shown in FIG. 5, or the method 600 shown in FIG. 6.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   scheduling at least one user equipment of a plurality of user equipment for wireless communication in a first transmission time interval (TTI) based on a plurality of weights associated with a plurality of user equipment; and
   in response to scheduling the at least one user equipment in the first TTI, modifying the plurality of weights associated with the plurality of user equipment based on a plurality of elapsed times since the plurality of user equipment were last scheduled for wireless communication in a previous TTI.

2. The method of claim 1, wherein modifying the plurality of weights comprises incrementing weights associated with user equipment that are not scheduled for wireless communication during the first TTI.

3. The method of claim 2, wherein incrementing the weights associated with the user equipment that are not scheduled for wireless communication during the first TTI comprises incrementing the weights associated with the user equipment until the weights reach a maximum value.

4. The method of claim 2, wherein modifying the plurality of weights comprises incrementing weights associated with the at least one user equipment that is scheduled for transmission during the first TTI in response to determining that data is available for transmission in a buffer associated with the at least one user equipment.

5. The method of claim 4, wherein incrementing the weights associated with the at least one user equipment that is scheduled for transmission during the first TTI comprises incrementing the weights associated with the at least one user equipment that are scheduled for transmission during the first TTI until the weights reach a sticky value.

6. The method of claim 2, wherein modifying the plurality of weights comprises decrementing weights associated with the at least one user equipment that is scheduled for transmission during the first TTI from a value that is larger than a sticky value in response to determining that data is available for transmission in a buffer associated with the at least one user equipment.

7. The method of claim 6, wherein decrementing the weights associated with the at least one user equipment that is scheduled for transmission during the first TTI comprises decrementing the weights associated with the at least one user equipment that is scheduled for transmission during the first TTI until the weights reach the sticky value.

8. The method of claim 1, wherein modifying the plurality of weights comprises setting weights associated with the at least one user equipment that is scheduled for transmission during the first TTI to a reset value in response to determining that no data is available for transmission in a buffer associated with the at least one user equipment following the transmission during the first TTI.

9. The method of claim 1, further comprising:
adding a new user equipment to the plurality of user equipment in response to the user equipment becoming eligible for scheduling in the first TTI; and
setting a weight associated with a new user equipment to an initial value in response to determining that data is newly available for transmission in a buffer associated with the new user equipment.

10. An apparatus comprising:
a transceiver for wireless communication with a plurality of user equipment; and
a processor configured to schedule at least one user equipment of the plurality of user equipment for wireless communication in a first transmission time interval (TTI) based on a plurality of weights associated with a plurality of user equipment and, in response to scheduling the at least one user equipment in the first TTI, modify the plurality of weights associated with the plurality of user equipment based on a plurality of elapsed times since the plurality of user equipment were last scheduled for wireless communication in a previous TTI.

11. The apparatus of claim 10, wherein the processor is configured to increment weights associated with user equipment that are not scheduled for wireless communication during the first TTI.

12. The apparatus of claim 11, wherein the processor is configured to increment the weights associated with the user equipment until the weights reach a maximum value.

13. The apparatus of claim 11, wherein the processor is configured to increment weights associated with the at least one user equipment that is scheduled for transmission during the first TTI in response to determining that data is available for transmission in a buffer associated with the at least one user equipment.

14. The apparatus of claim 13, wherein the processor is configured to increment the weights associated with the at least one user equipment that is scheduled for transmission during the first TTI until the weights reach a sticky value.

15. The apparatus of claim 11, wherein the processor is configured to decrement weights associated with the at least one user equipment that is scheduled for transmission during the first TTI from a value that is larger than a sticky value in response to determining that data is available for transmission in a buffer associated with the at least one user equipment.

16. The apparatus of claim 15, wherein the processor is configured to decrement the weights associated with the at least one user equipment that is scheduled for transmission during the first TTI until the weights reach the sticky value.

17. The apparatus of claim 10, wherein the processor is configured to set weights associated with the at least one user equipment that is scheduled for transmission during the first TTI to a reset value in response to determining that no data is available for transmission in a buffer associated with the at least one user equipment following the transmission during the first TTI.

18. The apparatus of claim 10, wherein the processor is configured to add a new user equipment to the plurality of user equipment in response to the user equipment becoming eligible for scheduling in the first TTI and set a weight associated with the new user equipment to an initial value in response to determining that new data is available for transmission in a buffer associated with the new user equipment.

19. A non-transitory computer readable storage medium embodying a set of executable instructions, the set of executable instructions to manipulate a processor to:
schedule at least one user equipment of a plurality of user equipment for wireless communication in a first transmission time interval (TTI) based on a plurality of weights associated with a plurality of user equipment; and
in response to scheduling the at least one user equipment in the first TTI, modify the plurality of weights associated with the plurality of user equipment based on a plurality of elapsed times since the plurality of user equipment were scheduled.

20. The non-transitory computer readable storage medium of claim 19, wherein the processor is to:
increment weights associated with user equipment that are not scheduled for wireless communication during the first TTI;
increment weights associated with the at least one user equipment that is scheduled for transmission during the first TTI in response to determining that data is available for transmission in a buffer associated with the at least one user equipment; and
set weights associated with the at least one user equipment that is scheduled for transmission during the first TTI to a reset value in response to determining that no data is available for transmission in a buffer associated with the at least one user equipment following the transmission during the first TTI.

* * * * *